(12) United States Patent
Kawai et al.

(10) Patent No.: US 10,873,085 B2
(45) Date of Patent: Dec. 22, 2020

(54) POSITIVE ELECTRODE FOR LITHIUM ION SECONDARY BATTERY AND LITHIUM ION SECONDARY BATTERY USING THE SAME

(71) Applicant: Murata Manufacturing Co., Ltd., Nagaokakyo (JP)

(72) Inventors: Toru Kawai, Nagaokakyo (JP); Masanori Morishita, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 704 days.

(21) Appl. No.: 15/591,426

(22) Filed: May 10, 2017

(65) Prior Publication Data

US 2017/0331113 A1 Nov. 16, 2017

Related U.S. Application Data

(63) Continuation of application No. PCT/JP2015/080928, filed on Nov. 2, 2015.

(30) Foreign Application Priority Data

Nov. 18, 2014 (JP) ................................ 2014-233552

(51) Int. Cl.
| | |
|---|---|
| *H01M 10/0525* | (2010.01) |
| *H01M 4/62* | (2006.01) |
| *H01M 4/131* | (2010.01) |
| *H01M 4/505* | (2010.01) |
| *H01M 4/525* | (2010.01) |
| *H01M 10/0566* | (2010.01) |
| *H01M 4/13* | (2010.01) |
| *H01M 4/485* | (2010.01) |
| *H01M 4/02* | (2006.01) |

(52) U.S. Cl.
CPC ............ *H01M 4/621* (2013.01); *H01M 4/13* (2013.01); *H01M 4/131* (2013.01); *H01M 4/485* (2013.01); *H01M 4/505* (2013.01); *H01M 4/525* (2013.01); *H01M 4/62* (2013.01); *H01M 4/625* (2013.01); *H01M 4/626* (2013.01); *H01M 10/0525* (2013.01); *H01M 10/0566* (2013.01); *H01M 2004/028* (2013.01); *H01M 2220/20* (2013.01)

(58) Field of Classification Search
CPC ...... H01M 4/621; H01M 4/625; H01M 4/485; H01M 4/626; H01M 4/525; H01M 4/505; H01M 10/0525
See application file for complete search history.

(56) References Cited

U.S. PATENT DOCUMENTS

| | | | | |
|---|---|---|---|---|
| 2009/0325076 | A1* | 12/2009 | Matsui | ............ H01M 10/0569 429/326 |
| 2014/0034872 | A1 | 2/2014 | Watanabe et al. | |
| 2015/0044567 | A1 | 2/2015 | Tanjo et al. | |

FOREIGN PATENT DOCUMENTS

| | | | |
|---|---|---|---|
| JP | 2007-184127 | A | 7/2007 |
| JP | 2011-060612 | A | 3/2011 |
| JP | 2013-020736 | A | 1/2013 |
| JP | 2013-201052 | A | 10/2013 |
| JP | 2013-206742 | A | 10/2013 |
| JP | 2013-222584 | A | 10/2013 |
| JP | 2013-222686 | A | 10/2013 |
| JP | 2013222686 | A * | 10/2013 |
| JP | 2014-96238 | A | 5/2014 |

OTHER PUBLICATIONS

Ohzuku et al. "Solid-state redox potentials for Li[Me1/2Mn3/2]O4 (Me:3d-transition metal) having spinel-framework structures: a series of 5 volt materials for advanced lithium-ion batteries" Journal (Year: 1999).*
Machine Translation and Abstract in English of JP-2013222686. (Year: 2019).*
International Search Report issued in International Application No. PCT/JP2015/080928, dated Jan. 12, 2016.
Written Opinion of the International Searching Authority issued in International Application No. PCT/JP2015/080928, dated Jan. 12, 2016.

* cited by examiner

*Primary Examiner* — Miriam Stagg
*Assistant Examiner* — Claire L Roe
(74) *Attorney, Agent, or Firm* — Arent Fox LLP

(57) ABSTRACT

A positive electrode for a lithium ion secondary battery that includes a positive electrode combination material having a positive electrode active material that produces a potential of 4.5 V or higher on the basis of metal lithium; a conduction aid; and a binder. The binder contains an aqueous binder as its main constituent, and the sum SE of the surface area SA of the positive electrode active material in the positive electrode combination material and the surface area SC of the conduction aid therein is 90 to 400 $cm^2/cm^2$ per unit coated area of the positive electrode combination material.

18 Claims, 3 Drawing Sheets

POSITIVE ELECTRODE FOR LITHIUM ION SECONDARY BATTERY AND LITHIUM ION SECONDARY BATTERY USING THE SAME

CROSS REFERENCE TO RELATED APPLICATIONS

The present application is a continuation of International application No. PCT/JP2015/080928, filed Nov. 2, 2015, which claims priority to Japanese Patent Application No. 2014-233552, filed Nov. 18, 2014, the entire contents of each of which are incorporated herein by reference.

FIELD OF THE INVENTION

The present invention relates to a lithium ion secondary battery, and more particularly, to a positive electrode constituting a lithium ion secondary battery, and a lithium ion secondary battery using the positive electrode.

BACKGROUND OF THE INVENTION

In recent years, the reduction in size and weight for cellular phones, laptop computers, and the like has progressed rapidly, and batteries as power sources for driving the phones, the computers, and the like have been required to have higher capacities. Further, under such circumstances, lithium ion secondary batteries have been widely used as power sources.

Further, as a positive electrode used for such a lithium ion secondary battery, it has been proposed to use an active material including a compound represented by the following composition formula 1 at particle surfaces, along with an aqueous binder.

Composition Formula 1: $Li_\alpha M_\beta O_\gamma$ (in the composition formula 1, M represents one, or two or more metal elements selected from the group consisting of Al, Ti, Cr, Mn, Fe, Co, Ni, Cu, Zr, Nb, Mo, Ag, Ta, W, and Ir, and $\alpha$, $\beta$, and $\gamma$ meet $0 \leq \alpha \leq 6$, $1 \leq \beta \leq \gamma \leq 5$, and $0 < \gamma \leq 12$) (see Patent Document 1)

In the case of the positive electrode having the configuration according to Patent Document 1, the use of the aqueous binder is supposed to make it possible to prevent oxidative decomposition of the aqueous binder during charging, without decreasing the capacity of the positive electrode active material due to elation of lithium in the positive electrode active material, thereby providing a positive electrode for a lithium ion secondary battery which has excellent high-temperature characteristics.

However, in the case of Patent Document 1, the surface of the positive electrode active material is coated with the compound represented by the composition Formula 1, or the surface of the positive electrode is over-coated therewith, and there is thus the problem of failing to achieve smooth movement of lithium ions between the active material and an electrolytic solution, thereby degrading charge/discharge rate characteristics.

Patent Document 2 proposes a positive electrode characterized as including a spinel-type lithium-nickel-manganese composite oxide and an alginate binder.

The alginate binder for use in the positive electrode in Patent Document 2 offers great flexibility, and can thus follow a relatively large change in the volume of the positive electrode during charge and discharge.

Furthermore, the inclusion of the alginate binder provides excellent oxidation resistance that has a significant influence on stability of the positive electrode. In addition, the alginate binder is an aqueous binder, and the positive electrode thus includes no organic solvent. Therefore, the burden on the environment is reduced, and the need for an organic solvent collection system is also eliminated.

In addition, a lithium ion secondary battery using the positive electrode has the advantages of great energy density and cycle characteristics.

However, in Patent Document 2, the application of the aqueous binder to the positive electrode has the problem of oxidatively decomposing the aqueous binder during charging (as also described in the paragraph 0010 of Patent Document 1 mentioned above), and even when the alginate binder which has excellent oxidation resistance is used for the positive electrode as in Patent Document 2, there is the problem of oxidatively decomposing the alginate binder at points of contact between high-potential positive electrode active material and conduction aid and the alginate binder, thereby causing gas generation, or causing charge/discharge rate characteristic to be degraded.

Patent Document 1: Japanese Patent Application Laid-open No. 2013-206742

Patent Document 2: Japanese Patent Application Laid-Open No. 2014-96238

SUMMARY OF THE INVENTION

The present invention is intended to solve the problem mentioned above, and an object of the present invention is to provide a positive electrode for a lithium ion secondary battery, which is capable of achieving excellent charge/discharge rate characteristics even when a aqueous binder is used, and inhibiting oxidative decomposition of a non-aqueous electrolytic solution, and a lithium ion secondary battery using the positive electrode.

In order to solve the problem mentioned above, the positive electrode for a lithium ion secondary battery according to the present invention contains a positive electrode combination material that includes a positive electrode active material that produces a potential of 4.5 V or higher on the basis of metal lithium; a conduction aid; and a binder. The binder contains a aqueous binder as its main constituent, and the sum SE of the surface area SA of the positive electrode active material in the positive electrode combination material and the surface area SC of the conduction aid therein is 90 to 400 $cm^2/cm^2$ per unit coated area of the positive electrode combination material.

In the positive electrode for a lithium ion secondary battery according to the present invention, the aqueous binder preferably includes a substance having a carboxyl group.

The use of the positive electrode configured as mentioned above makes it possible to provide a lithium ion secondary battery which is capable of achieving a balance between great charge/discharge rate characteristics and inhibited oxidative decomposition of a non-aqueous electrolytic solution at the positive electrode surface.

More specifically, the aqueous binder having a carboxyl group has a high affinity for the surfaces of the positive electrode active material and carbon-based conduction aid, and thus achieves a greater coating effect, thereby making it possible to inhibit the oxidative decomposition of a non-aqueous electrolytic solution more reliably.

In addition, the aqueous binder preferably includes a copolymer including a carboxymethyl cellulose, a polyacrylic acid, an acrylic acid, a metal salt or ammonium salt thereof, or at least one selected from the group thereof.

It is to be noted that Na salts and K salts can be used as the metal salt.

In addition, the sum SE is preferably 150 to 300 cm²/cm² per unit coated area of the positive electrode combination material.

In addition, the conduction aid preferably includes non-graphitizable carbon.

In addition, the positive electrode active material is preferably a spinel-type lithium-nickel-manganese oxide having a composition formula of $Li_{1+a}[Mn_{2-a-x-y}Ni_zM_y]O_4$ (where $0 \leq a \leq 0.2$, $0.4 \leq x \leq 0.6$, $0 \leq y \leq 0.3$, and M represents at least one metal element containing Ti).

Furthermore, a lithium ion secondary battery according to the present invention characteristically includes the positive electrode according to the present invention, a negative electrode, and a non-aqueous electrolytic solution.

The application of the positive electrode configured as mentioned above to a lithium ion secondary battery makes it possible to provide a lithium ion secondary battery which is capable of exhibiting great charge/discharge rate characteristics, and inhibiting oxidative decomposition of a non-aqueous electrolytic solution at the positive electrode surface, thereby suppressing cell bulge due to gas generation.

More specifically, the aqueous binder is more effective in coating the positive electrode active material and the conduction aid, as compared with solvent-based binders such as polyvinylidene fluoride, thereby making it possible to reduce the area of contact between the active material or conduction aid and an electrolytic solution, and thus inhibit oxidative decomposition of a non-aqueous electrolytic solution at the surface of the positive electrode combination material.

It is to be noted that in the positive electrode for a lithium ion secondary battery according to the present invention, when the sum SE of the surface area SA of the positive electrode active material and the surface area SC of the conduction aid per unit coated area of the positive electrode combination material is less than 90 cm²/cm², the insufficient area of contact between the positive electrode combination material and the non-aqueous electrolytic solution unfavorably fails to cause an electrochemical reaction to proceed smoothly at the interface between the positive electrode combination material and the non-aqueous electrolytic solution, thereby degrading charge/discharge rate characteristics.

Alternatively, when the sum SE of the surface area SA of the positive electrode active material and the surface area SC of the conduction aid per unit coated area of the positive electrode combination material exceeds 400 cm²/cm², the excessively increased area of contact between the positive electrode combination material and the non-aqueous electrolytic solution unfavorably causes oxidative decomposition of the non-aqueous electrolytic solution to proceed significantly at the surface of the positive electrode combination material, thereby generating a large amount of gas.

In addition, the lithium ion secondary battery according to the present invention includes the above-mentioned positive electrode, a negative electrode, and a non-aqueous electrolytic solution, thus making it possible to provide a lithium ion secondary battery which achieves a balance between great charge/discharge rate characteristics and inhibited oxidative decomposition of the non-aqueous electrolytic solution at the positive electrode surface, and has a high operating voltage and a high energy density.

It is to be noted that in accordance with the present invention, the surface area SA of the positive electrode active material [cm²/cm²] refers to a value obtained from the formula (1):

Surface Area SA of Positive Electrode Active Material [cm²/cm²]=Weight of Positive Electrode Active Material included per Unit Coated Area of Positive Electrode Combination Material [mg/cm²]×BET Specific Surface Area of Positive Electrode Active Material [m²/g]×10    (1)

In addition, the surface area SC of the conduction aid [cm²/cm²] refers to a value obtained from the formula (2):

Surface Area SC of Conduction Aid [cm²/cm²]=Weight of Conduction Aid included per Unit Coated Area of Positive Electrode Combination Material [mg/cm²]×BET Specific Surface Area of Conduction Aid [m²/g]×10    (2)

In addition, the sum SE of the surface area SA of the positive electrode active material in the positive electrode combination material and the surface area SC of the conduction aid therein refers to a value obtained from the formula (3):

Sum (SE) of Surface Area of Positive Electrode Active Material in Positive Electrode Combination Material and Surface Area of Conduction Aid therein [cm²/cm²]=Surface Area SA of Positive Electrode Active Material+Surface Area SC of Conduction Aid    (3)

DETAILED DESCRIPTION OF THE INVENTION

Figure 1:
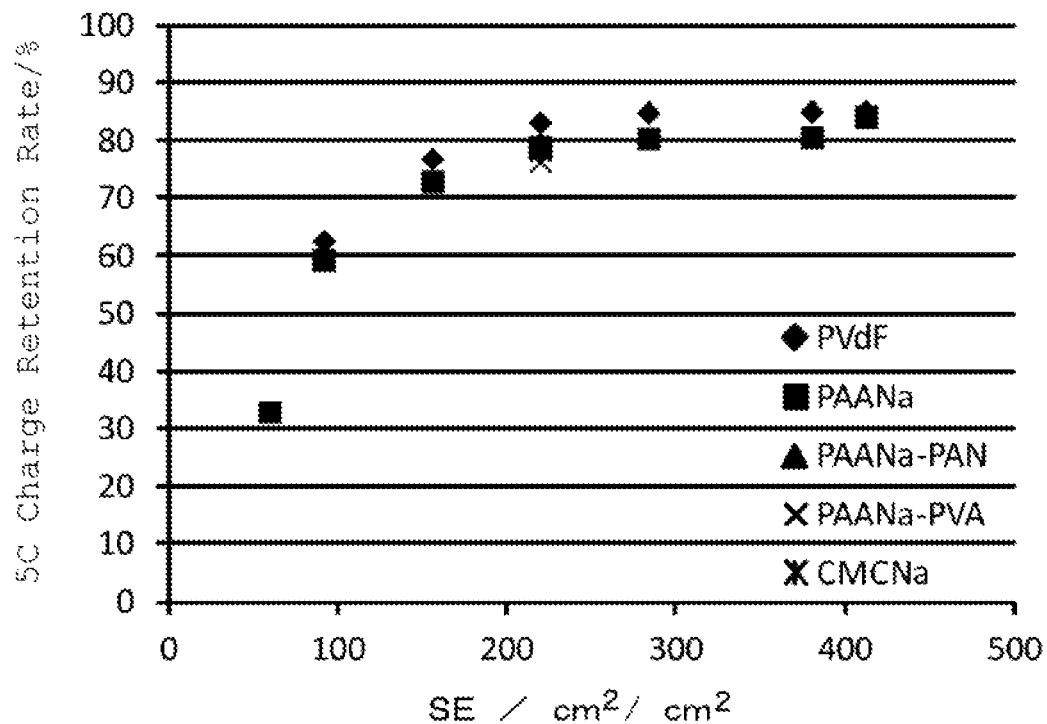
FIG. 1 is a diagram showing the relationship between the sum SE of the surface area SA of the positive electrode active material and the surface area SC of the conduction aid and the 5 C charge retention rate according to Examples 1 to 8 and Comparative Examples 1 to 8 in Table 3.

A positive electrode for a lithium ion secondary battery according to an embodiment of the present invention, and an embodiment of a lithium ion secondary battery using the positive electrode will be described below.

The positive electrode for a lithium ion secondary battery according to an embodiment of the present invention includes a positive electrode active material that produces a potential of 4.5 V or higher on the basis of metal lithium, a conduction aid, and a binder.

In the positive electrode for a lithium ion secondary battery, the positive electrode active material that produces a potential of 4.5 V or higher on the basis of metal lithium is not particularly limited, but spinel-type lithium-manganese oxides such as $LiNi_{0.5}Mn_{1.5}O_4$ and $LiCoMnO_4$, inverse-spinel type lithium-vanadium oxides such as LiNiVO$_4$, polyanion compounds such as LiCoPO$_4$ and LiNiPO$_4$ can be used.

Among these compounds, from the standpoints of charge/discharge stability and charge/discharge capacity at a potential of 4.5 V or higher, the positive electrode active material is preferably a spinel-type lithium-nickel-manganese oxide. Furthermore, the positive electrode active material is more preferably a spinel-type lithium-nickel-manganese oxide represented by the composition formula Li$_{1+a}$[Mn$_{2-a-x-y}$Ni$_x$M$_y$]O$_4$ (where $0 \leq a \leq 0.3$, $0.4 \leq x \leq 0.6$, $0 \leq y \leq 0.3$, and M represents at least one metal element containing Ti).

Carbon black such as acetylene black, thermal black, Ketjen Black, and furnace black, non-graphitizable carbon, vapor-grown carbon fibers (VGCF), carbon tubes, graphite, graphitizable carbon, graphene, metal powders, and the like can be used as the conduction aid. Among the foregoing, the non-graphitizable carbon is preferably included from the perspective of charge/discharge rate characteristics and suppression of cell bulge due to gas generation.

In the positive electrode for a lithium ion secondary battery, a aqueous binder is used as the binder.

Further, as the aqueous binder, a binder can be preferably used which includes a copolymer including a carboxymethyl cellulose, a polyacrylic acid, an acrylic acid, a metal salt or ammonium salt thereof, or at least one selected from the group thereof.

The foregoing positive electrode active material, conduction aid, and binder are used to prepare the positive electrode for a lithium ion secondary battery according to an embodiment of the present invention.

First, the positive electrode active material, the conduction aid, and the binder are mixed in predetermined proportions. A solvent that dissolves the binder is added thereto, and mixed therewith, thereby providing a slurry form. This slurry is applied onto a current collector through the control of the application amount such that the sum SE of the surface area SA of the positive electrode active material and the surface area SC of the conduction aid in the positive electrode combination material is 90 to 400 cm$^2$/cm$^2$ per unit coated area of the positive electrode combination material, and dried, thereby forming a positive electrode combination material layer. If necessary, pressure forming such as pressing, and cutting are carried out, thereby preparing the positive electrode.

The current collector of the positive electrode is not particularly limited, but for example, foil, an expanded metal, a punching metal, a mesh, or the like of aluminum, stainless steel, titanium, nickel, or alloy thereof can be used, and in particular, aluminum foil is preferred.

A lithium ion secondary battery according to an embodiment of the present invention as described below can be prepared with the use of the thus prepared positive electrode, a negative electrode, and a non-aqueous electrolytic solution.

The following can be used as the negative electrode for use in the lithium ion secondary battery.

It is possible to use any negative electrode active material without any particular limitation, as long as the material electrochemically reacts with lithium ions, and examples of the material include carbon materials such as natural graphite, artificial graphite, graphitizable carbon, and non-graphitizable carbon, alloy-based negative electrodes such as silicon and tin, oxides such as lithium titanate, titanium oxide, silicon oxide, and tin oxide, and metal lithium. One of these materials may be used alone, or two or more thereof may be used in combination.

In the case of preparing the negative electrode, first, the negative electrode active material mentioned above, the same binder as in the case of the previously described positive electrode, a solvent that dissolves the binder, and if necessary, the same conduction aids as in the case of the positive electrode are added and mixed, thereby providing a slurry form. This slurry is applied onto a current collector, and dried to form a negative electrode combination material layer. If necessary, pressure molding such as pressing, and cutting are carried out, thereby preparing the negative electrode.

The current collector used for the negative electrode is not particularly limited, but for example, foil, an expanded metal, a punching metal, a mesh, or the like of copper, stainless steel, titanium, nickel, or alloy thereof can be used. In particular, copper foil is preferably used.

A solution including an electrolyte salt and an organic solvent is used as the non-aqueous electrolytic solution for use in the lithium ion secondary battery according to this embodiment.

In addition, the electrolyte salt is also not particularly limited, but it is possible to use, for example, LiPF$_6$, LiClO$_4$, LiBF$_4$, LiCF$_3$SO$_3$, Li(CF$_3$SO$_2$)$_2$N, Li(C$_2$F$_5$SO$_2$)$_2$N, Li(CF$_3$)$_2$N, and LiB(CN)$_4$, and one of these salts may be used alone, or two or more thereof may be used in combination. The electrolyte salt concentration in the non-aqueous electrolytic solution is desirably 0.3 to 4 mol/L.

In addition, the organic solvent is also not particularly limited, but carbonate-type solvents, lactone-type solvents, sulfone-type solvents, nitrile-type solvents, ester-type solvents, ether-type solvents, and the like can be used. In addition, for the purpose of improving the oxidation resistance of these solvents, the solvents partially substituted with an element that is high in electronegativity, such as fluorine, may be also used. One of these solvents may be used alone, or two or more thereof may be used in combination.

In addition, for the purpose of improving the oxidation resistance of the non-aqueous electrolytic solution, or for the purpose of forming, on the surface of the positive electrode or the negative electrode, a protective film that inhibits the decomposition of the non-aqueous electrolytic solution, various types of additives may be added, if necessary. The additives include additives that dissolve in organic solvents or also serve as an organic solvents, e.g., carbonate-type compounds such as vinylene carbonate and fluoro-ethylene carbonate, sulfur-type compounds such as 1,3-propanesultone, and lithium salts such as lithium bis(oxalate)borate.

Figure 4:
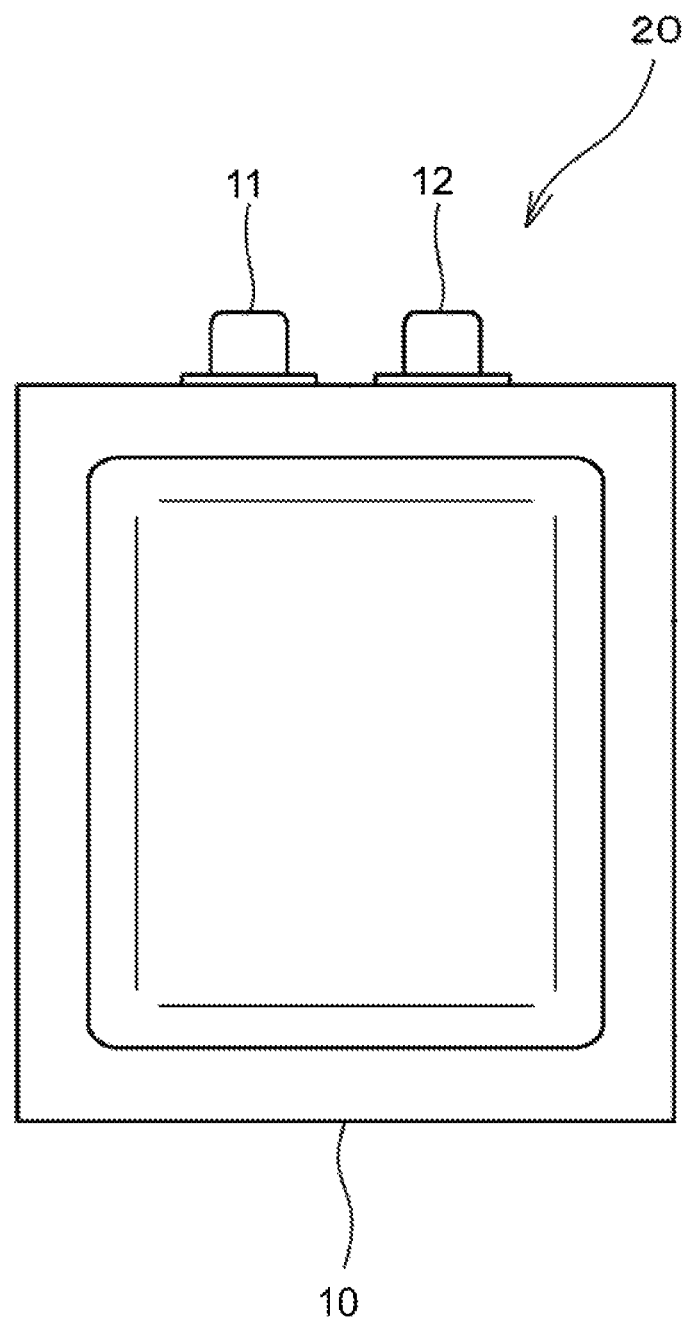
FIG. 4 is an example of a lithium ion secondary battery according to an embodiment of the present invention.

The lithium ion secondary battery 20 according to an embodiment of the present invention can be prepared by forming a positive electrode 11, negative electrode 12, and non-aqueous electrolytic solution described above within a laminated body 10 as shown in FIG. 4.

Features of the present invention will be described in more detail below with reference to more specific embodiments of the present invention.

[1] Positive Electrode Active Material

A lithium carbonate (Li$_2$CO$_3$) as a lithium-containing raw material, a nickel hydroxide (Ni(OH)$_2$) as a nickel-containing raw material, trimanganese tetraoxide (Mn$_3$O$_4$) as a manganese-containing raw material, and an anatase-type titanium oxide (TiO$_2$) as a titanium-containing raw material were prepared, and these raw materials were weighed so as to meet a predetermined composition ratio.

The weighed raw materials were mixed with a ball mill with the use of water for a solvent and zirconia balls of 5 mm in diameter, thereby preparing slurry. This slurry was subjected to spray drying, thereby providing a dried powder.

Then, the dried powder obtained was put in a sagger containing alumina as its main constituent, and subjected to firing for 10 hours at a temperature of 1050° C. in the atmosphere, and then firing for 20 hours at a temperature of 7006° C. in the atmosphere. This fired product was subjected to grinding in a mortar, thereby providing a positive electrode active material.

This positive electrode active material was subjected to composition analysis by inductively-coupled plasma atomic emission spectroscopy (ICP-AES), and the specific surface area of the material was measured by a BET method. Furthermore, the average particle size ($D_{50}$) was measured with a laser diffraction-scattering type particle size distribution meter.

The results are shown in Table 1.

TABLE 1

| | Composition | Specific Surface Area ($m^2/g$) | Average Particle Size (μm) |
|---|---|---|---|
| Positive Electrode Active Material | $Li_{1.1}[Ni_{0.45}Mn_{1.35}Ti_{0.2}]O_4$ | 0.30 | 17 |

[2] Conduction Aid

Carbon black and non-graphitizable carbon were prepared as the conduction aid.

Then, the specific surface areas of the carbon black and non-graphitizable carbon were checked by the same method as in the case of the positive electrode active material described above. In addition, the carbon black was observed with an electron microscope, thereby checking particle sizes, and the arithmetic mean was obtained, thereby providing the average particle sizes. Furthermore, the average particle size ($D_{50}$) of the non-graphitizable carbon was measured with a laser diffraction-scattering type particle size distribution meter.

The results are shown in Table 2.

TABLE 2

| | Specific Surface Area ($m^2/g$) | Average Particle Size (nm) |
|---|---|---|
| Carbon Black | 91 | 28 |
| Non-Graphitizable Carbon | 1.9 | 15 |

[3] Binder

In this embodiment, a polyvinylidene fluoride (PVdF) as an organic solvent-based binder, a sodium polyacrylate (PAANa) as a aqueous binder, a copolymer (PAANa-PAN) of sodium acrylate and acrylonitrile, a copolymer (PAANa-PVA) of sodium acrylate and vinyl alcohol, and carboxymethyl cellulose sodium (CMCNa) were used as the binder.

It is to be noted that the polyvinylidene fluoride (PVdF) is a binder for comparison, which fails to meet the requirements of the present invention.

[4] Preparation of Positive Electrode

The positive electrode active material, carbon black, non-graphitizable carbon described above, a solution of the above-described binder dissolved were mixed in ratio by weight as shown in Table 3, thereby preparing positive electrode combination material slurry.

The binder dissolved in a solvent in advance was used in a solution state, and N-methyl-2-pyrrolidone was used for the solvent in the case of polyvinylidene fluoride (PVdF), whereas water was used for the solvent in the case of the binder other than polyvinylidene fluoride (PVdF).

Then, the positive electrode combination material slurry was applied to one or both sides of aluminum foil of 15 μm in thickness as a positive electrode current collectors, such that the weight per unit coated area of the positive electrode active material included in the dried positive electrode combination material was approximately 7.2 mg/cm$^{20}$ per side. Then, the slurry was dried at a temperature of 140° C. when the binder was polyvinylidene fluoride (PVdF), or 80° C. in the case other than polyvinylidene fluoride (PVdF), and thereafter, subjected to pressing by roll press such that the positive electrode combination material density fell within the range of 2.7 to 3.0 g/cm$^3$, thereby preparing positive electrodes (samples) according to Examples 1 to 8 and positive electrodes (samples) according to Comparative Examples 1 to 8.

Then, the surface area SA [cm$^2$/cm$^2$] of positive electrode active material was obtained from the following formula with the use of the weight (mg/cm$^2$) for each material included per unit coated area of the positive electrode combination material, and the values of the specific surface areas (m$^2$/g) of the respective materials, obtained by a BET method.

Surface Area SA of Positive Electrode Active Material [cm$^2$/cm$^2$]=Weight of Positive Electrode Active Material included per Unit Coated Area of Positive Electrode Combination Material [mg/cm$^2$]×BET Specific Surface Area of Positive Electrode Active Material [m$^2$/g]×10

In addition, the surface area SC of the conduction aid [cm$^2$/cm$^2$] was obtained from the following formula.

Surface Area SC of Conduction Aid [cm$^2$/cm$^2$]= (Weight of Carbon Black included per Unit Coated Area of Positive Electrode Combination Material [mg/cm$^2$]×BET Specific Surface Area of Carbon Black [m$^2$/g]+Weight of Non-Graphitizable Carbon included per Unit Coated Area of Positive Electrode Combination Material [mg/cm$^2$]×BET Specific Surface Area of Non-Graphitizable Carbon [m$^2$/g])×10

In addition, the sum SE of the surface area SA of the positive electrode active material in the positive electrode combination material and the surface area SC of the conduction aid therein was obtained from the following formula.

Sum (SE) of Surface Area of Positive Electrode Active Material in Positive Electrode Combination Material and Surface Area of Conduction Aid therein [cm$^2$/cm$^2$]=Surface Area SA of Positive Electrode Active Material+Surface Area SC of Conduction Aid In this regard, the area coated with the positive electrode combination material refers to the area of a part with the positive electrode combination material applied to the surface of the positive electrode current collector, and for example, the area coated with the positive electrode combination material is 10 cm$^2$ when the positive electrode combination material is applied entirely to one side of the 10 cm$^2$ positive electrode current collector, whereas the area coated with the positive electrode combination material is 20 cm$^2$ when the positive electrode combination material is applied entirely to both sides thereof.

[5] Preparation of Negative Electrode for Wound Battery

Graphite as a negative electrode active material and polyvinylidene fluoride as a binder were mixed in proportions at 92.5:7.5 in ratio by weight, and N-methyl-2-pyrrolidone was added to the mixture, thereby preparing negative electrode combination material slurry.

This negative electrode combination material slurry was applied to both sides of electrolytic copper foil of 10 μm in thickness as a negative electrode current collector, such that the weight per unit coated area of the negative electrode active material included in the dried negative electrode combination material was approximately 3.5 mg/cm$^2$ per side.

Then, the negative electrode combination material slurry applied was dried at a temperature of 140° C., and thereafter, subjected, to pressing by roll press such that the negative electrode combination material density fell within the range of 1.0 to 1.3 g/cm$^3$. The pressed negative electrode was cat out into a strip shape of 44 mm×460 mm, and a nickel tab is welded thereto, thereby preparing a negative electrode for a wound battery.

[6] Preparation of Coin Battery (Coin-Type Lithium Ion Secondary Battery)

The positive electrode with the positive electrode combination material applied to one side was subjected to punching into a disc of 12 mm in diameter as a positive electrode for a coin battery.

Disc-like metal lithium of 15 mm in diameter was attached to a stainless-steel current collecting plate of 15 mm in diameter as a negative electrode for a coin battery.

For a separator, a glass filter (Trade Name "ADVANTEC GA-100") of 16 mm in diameter was used.

For an electrolytic solution, 1M LiPF$_6$ ethylene carbonate (EC):ethylmethyl carbonate (EMC)=1:3 (volume ratio) was used.

Then, the above-mentioned positive electrode for a coin battery, negative electrode for a coin battery, separator, and electrolytic solution were used to prepare a coin battery.

It is to be noted that this coin battery is a sample prepared to carry out a charge/discharge rate test as described later and check the 5 C charge retention rate [%] and the 5 C discharge retention rate [%].

[7] Preparation of Wound Battery (Wound Lithium Ion Secondary Battery)

The positive electrode with the positive electrode combination material applied to both sides was cut out into a strip of 42 mm×370 mm, with an aluminum tab welded thereto, thereby preparing a positive electrode for a wound battery.

For a separator, a polyethylene microporous membrane of 15 μm in thickness was used.

Then, the above-mentioned positive electrode for a wound battery, the negative electrode for a wound battery, prepared in accordance with the section [5], and the separator were wound with a winding machine, thereby preparing a wound body. For an electrolytic solution, 1M LiPF$_6$ EC:EMC=1:3 (volume ratio) was used. For an outer package, an aluminum laminate was used.

Then, the wound body, the electrolytic solution, and the outer package were used to prepare a wound battery (wound lithium ion secondary battery).

It is to be noted that this wound battery is a sample prepared to carry out a constant-voltage charging test as described later and measure the amount of gas generation.

[8] Charge/Discharge Rate Test for Coin Battery

For the coin battery prepared in the way described above, the positive electrode was subjected to the charge/discharge rate test. In a thermostatic bath at 25° C., 3 cycles of charge/discharge were carried out at a current value of 0.2 mA/cm$^2$ in a voltage range of 3.0 to 5.0 V. The charge capacity and discharge capacity of the third cycle were respectively regarded as "0.2 C charge capacity" and "0.2 C discharge capacity". Thereafter, the charge capacity in the case of charging up to 5.0 V at a current value of 5.1 mA/cm$^2$ was regarded as a "SC charge capacity". Thereafter, in the case of leaving the open circuit for 10 minutes, charging up to 5.0 V at a current value of 0.20 mA/cm$^2$ and discharging down to 3.0 V at a current value of 5.1 mA/cm$^2$, the discharge capacity was regarded as a "5 C discharge capacity". The "5 C charge retention rate" was calculated from the following formula (4), whereas the "5 C discharge retention rate" was calculated from the following formula.

5 C Charge Retention Rate [%]={(5 C Charge Capacity)/(0.2 C Charge Capacity)}×100

5 C Discharge Retention Rate [%]={(5 C Discharge Capacity)/(0.2 C Discharge Capacity)}×100

[9] Constant-Voltage Charging Test for Wound Battery

The wound battery prepared in the way described above was subjected to the constant-voltage charging test, and the amount of gas generation was measured from the volume change of the cell between before and after the test.

In a thermostatic bath at 45° C., the battery was subjected to constant-voltage charging for 168 hours at 4.9 V, immediately after charging up to 4.9 V at a current value of 50 mA. After the charging, the battery was discharged down to 3.0 V at a current value of 50 mA. The volumes of the cell before and after the constant-voltage charging test were measured by an Archimedes method, and the amount of gas generation was calculated from the following formula.

The Amount of Gas Generation [mL]=(Volume of Cell after Constant-Voltage Charging Test)−(Volume of Cell before Constant-Voltage Charging Test)

<Evaluation>

Table 3 shows the materials used for the positive electrode combination material, and the ratios of the materials by weight, SE, the 5 C discharge capacity, the 5 C charge retention rate, and the amount of gas generation in the case of using the above-described positive electrode active material (see Table 1) for the positive electrode active material.

It is to be noted that as for the data on the positive electrodes according to Examples 1 to 8 in Table 3 and the positive electrodes according to Comparative Examples 1 to 8 in Table 3, the 5 C charge retention rate [%] and the 5 C discharge retention rate [%] refer to data obtained with, as samples, coin batteries prepared in the way described above, and the amount of gas generation refers to data obtained with, as samples, wound batteries as described above, prepared with the use of positive electrodes under the same conditions as for the above-described coin batteries checked on the 5 C charge retention rates and the 5 C discharge retention rates.

TABLE 3

| | Positive Electrode Active Material in Ratio by Weight (%) Positive Electrode Active Material | Carbon Black in Ratio by Weight (%) Carbon Black | Non-Graphitizable Carbon in Ratio by Weight (%) Non-Graphitizable Carbon | Binder Type | Binder Ratio by Weight (%) | SE (cm²/cm²) | 5 C Charge Retention Rate (%) | 5 C Discharge Retention Rate (%) | Amount of Gas Generation (mL) |
|---|---|---|---|---|---|---|---|---|---|
| Comparative Example 1 | 88 | 6 | 0 | PVdF | 6 | 412 | 85 | 98 | 40 |
| Comparative Example 2 | | 5.5 | 0.5 | | | 380 | 85 | 84 | 37 |
| Comparative Example 3 | | 4 | 2 | | | 284 | 85 | 91 | 33 |
| Comparative Example 4 | | 3 | 3 | | | 220 | 83 | 91 | 27 |
| Comparative Example 5 | | 2 | 4 | | | 156 | 77 | 86 | 24 |
| Comparative Example 6 | | 1 | 5 | | | 91 | 63 | 70 | 18 |
| Comparative Example 7 | | 6 | 0 | PAANa | | 412 | 84 | 99 | 43 |
| Example 1 | | 5.5 | 0.5 | | | 380 | 81 | 93 | 32 |
| Example 2 | | 4 | 2 | | | 284 | 81 | 90 | 25 |
| Example 3 | | 3 | 3 | | | 220 | 79 | 90 | 19 |
| Example 4 | | 2 | 4 | | | 156 | 73 | 85 | 16 |
| Example 5 | | 1 | 5 | | | 91 | 59 | 70 | 16 |
| Comparative Example 8 | | 0.5 | 5.5 | | | 59 | 33 | 37 | 15 |
| Example 6 | | 3 | 3 | PAANa-PAN | | 220 | 80 | 87 | 10 |
| Example 7 | | 3 | 3 | PAANa-PVA | | 220 | 76 | 89 | 18 |
| Example 8 | | 3 | 3 | CMCNa | | 220 | 78 | 85 | 18 |

In addition, FIG. 1 shows the relationship between the sum SE of the surface area SA of the positive electrode active material and the surface area SC of the conduction aid and the 5 C charge retention rate according to Examples 1 to 8 and Comparative Examples 1 to 8 in Table 3.

Figure 2:
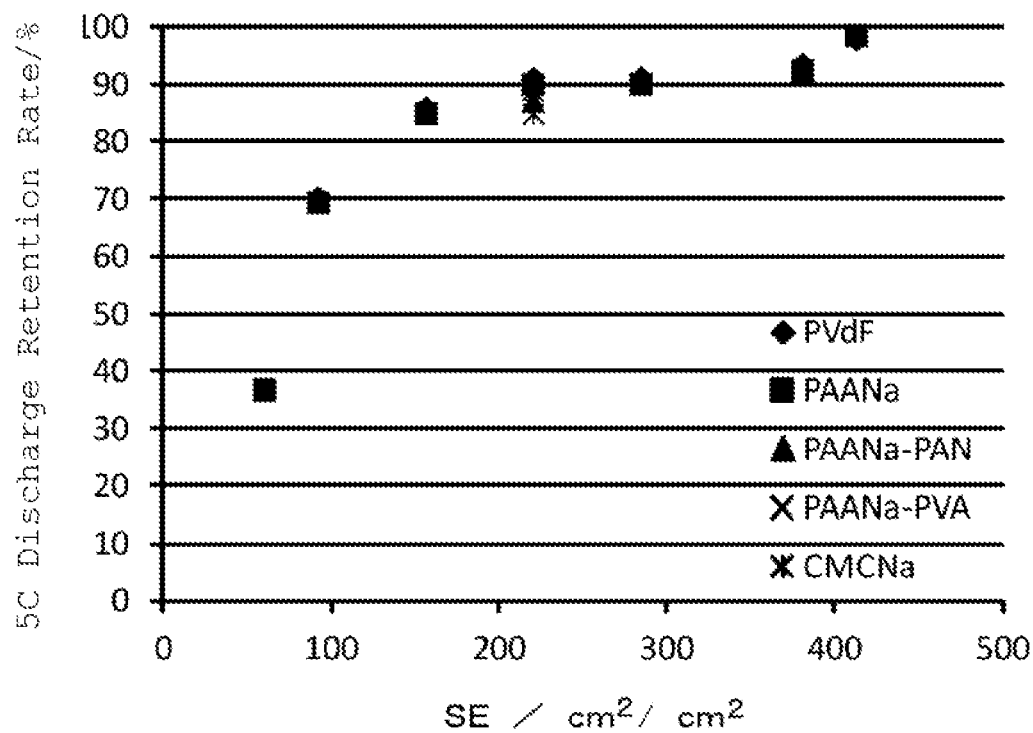
FIG. 2 is a diagram showing the relationship between the sum SE of the surface area SA of the positive electrode active material and the surface area SC of the conduction aid and the 5 C discharge retention rate according to Examples 1 to 8 and Comparative Examples 1 to 8 in Table 3.

FIG. 2 snows the relationship between the sum SE of the surface area SA of the positive electrode active material and the surface area SC of the conduction aid and the 5 C discharge retention rate according to Examples 1 to 8 and Comparative Examples 1 to 8 in Table 3.

Figure 3:
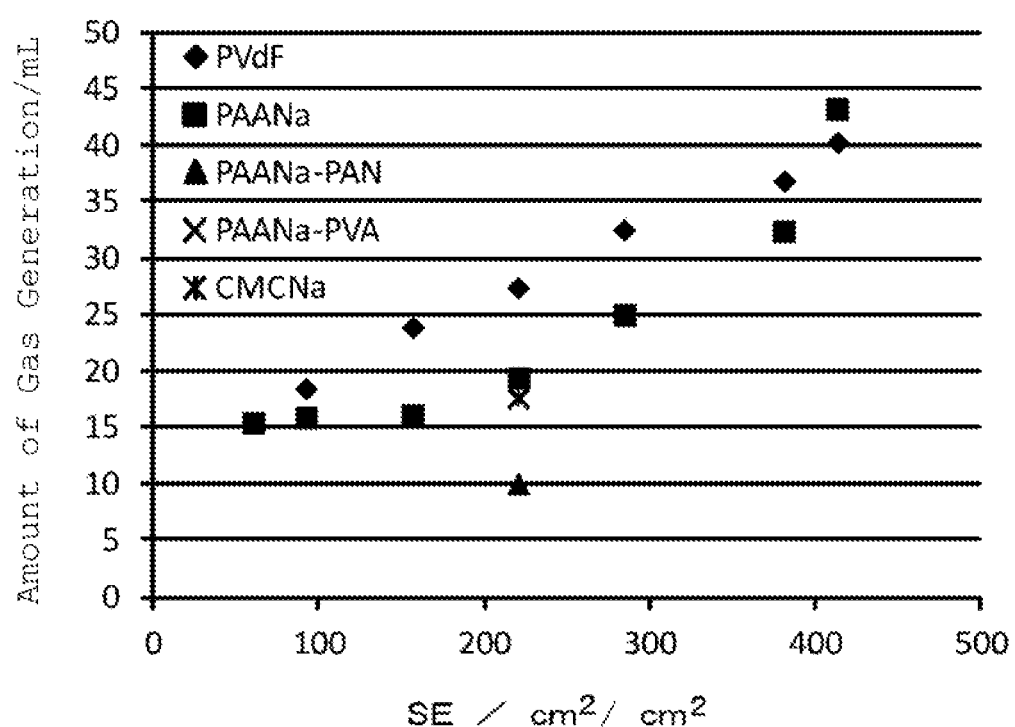
FIG. 3 is a diagram showing the relationship between the sum SE of the surface area SA of the positive electrode active material and the surface area SC of the conduction aid and the amount of gas generation according to Examples 1 to 8 and Comparative Examples 1 to 8 in Table 3.

Furthermore, FIG. 3 shows the relationship between the sum SE of the surface area SA of the positive electrode active material and the surface area SC of the conduction aid and the amount of gas generation according to Examples 1 to 8 and Comparative Examples 1 to 8 in Table 3.

As shown in Table 3 and FIGS. 1 and 2, it has been confirmed that when the sum SE of the surface area SA of the positive electrode active material and the surface area SC of the conduction aid falls within the range of 90 to 400 cm²/cm², the positive electrodes using the aqueous binders for the binder according to Examples 1 to 8 have great charge/discharge rate characteristics with the 5 C charge retention rate of 50% or more and SC discharge retention rate of 70% or more shown to be almost equal to those of the positive electrodes ail using polyvinylidene fluoride (PVdF) for the binder according to Comparative Examples 2 to 6.

In addition, it has been confirmed that when the sum SE of the surface area SA of the positive electrode active material and the surface area SC of the conduction aid is 150 cm²/cm² or more as in Examples 1 to 4, 6, and 7, positive electrodes are achieved which have greater charge/discharge rate characteristics with the 5 C charge retention rate of 70% or more and 5 C discharge retention rate of 80% or more shown.

On the other hand, it has been confirmed that the positive electrode according to Comparative Example 8 where the sum SE of the surface area SA of the positive electrode active material and the surface area SC of the conduction aid is less than 90 cm²/cm² has charge/discharge rate characteristics degraded, with the 5 C charge retention rate of 33%.

In addition, as shown in Table 3 and FIG. 3, it has been confirmed that when the sum SE of the surface area SA of the positive electrode active material and the surface area SC of the conduction aid falls within the range of 90 to 400 cm²/cm², in comparison between the positive electrodes using sodium polyacrylate (PAANa) for the binder according to Examples 1 to 5 and the positive electrodes using polyvinylidene fluoride (PVdF) for the binder according to Comparative Examples 2 to 6 with SE of the same value, the oxidative decomposition of the non-aqueous electrolytic solution at the positive electrode surfaces is inhibited, with smaller amounts of gas generation in each case of using the sodium polyacrylate (PAANa) for the binder. In addition, it has been confirmed that the positive electrodes using the other aqueous binders according to Examples 6 to 8 also achieve similar effects.

Furthermore, it has been confirmed that as long as the sum SE of the surface area SA of the positive electrode active material and the surface area SC of the conduction aid is 300 cm²/cm² or less as in Examples 2 to 8, the oxidative decomposition of the non-aqueous electrolytic solution at the positive electrode surfaces is further reliably inhibited, with the amount of gas generation reduced to 25 mL or less.

It has been confirmed that the positive electrode according to Comparative Example 7 (using sodium polyacrylate (PAANa) for the binder) where the sum SE of the surface area SA of the positive electrode active material and the surface area SC of the conduction aid is more than 400 cm²/cm² has an increased amount of gas generation, as compared with Comparative Example 1 (using polyvinylidene fluoride (PVdF) for the binder) where the sum SE of the surface area SA of the positive electrode active material and the surface area SC of the conduction aid has the same value. This is believed to be because the increased sum SE of the surface area SA of the positive electrode active material and the surface area SC of the conduction aid increased the area of contact between the positive electrode combination material and the binder, thereby causing the oxidative decomposition of the aqueous binder to proceed, and thus increasing the amount of gas generation.

It is to be noted that the present invention is not limited to the embodiments described above, but various applications and modifications can be made within the scope of the invention, in regard to the types of the positive electrode active material, conduction aid, and binder constituting the positive electrode, the configuration of the negative electrode constituting the lithium ion secondary battery, the composition of the non-aqueous electrolytic solution, and the like.

The invention claimed is:

1. A positive electrode combination material comprising:
a positive electrode active material that produces a potential of 4.5 V or higher on the basis of metal lithium;
a conduction aid; and
a binder containing an aqueous binder as its main constituent,
wherein a sum SE of a surface area SA of the positive electrode active material and a surface area SC of the conduction aid is 90 to 400 cm$^2$/cm$^2$ per unit coated area of the positive electrode combination material.

2. The positive electrode combination material according to claim 1, wherein the aqueous binder comprises a substance having a carboxyl group.

3. The positive electrode combination material according to claim 1, wherein the aqueous binder comprises at least one selected from a copolymer comprising a carboxymethyl cellulose, a polyacrylic acid, an acrylic acid, a metal salt or ammonium salt thereof.

4. The positive electrode combination material according to claim 1, wherein the sum SE is 150 to 300 cm$^2$/cm$^2$ per unit coated area of the positive electrode combination material.

5. The positive electrode combination material according to claim 1, wherein the conduction aid is selected from carbon black, non-graphitizable carbon, vapor-grown carbon fibers, carbon tubes, graphite, graphitizable carbon, graphene, and metal powders.

6. The positive electrode combination material according to claim 1, wherein the conduction aid comprises non-graphitizable carbon.

7. The positive electrode combination material according to claim 1, wherein the positive electrode active material is selected from spinel-type lithium-manganese oxides, inverse-spinel type lithium-vanadium oxides, and polyanion compounds.

8. The positive electrode combination material according to claim 1, wherein the positive electrode active material is a spinel-type lithium-nickel-manganese oxide having a composition formula of $Li_{1+a}[Mn_{2-a-x-y}Ni_xM_y]O_4$, wherein
$0 \leq a \leq 0.2$,
$0.4 \leq x \leq 0.6$,
$0 \leq y \leq 0.3$, and
M is at least one metal element containing Ti.

9. The positive electrode combination material according to claim 1, wherein
the aqueous binder comprises a substance having a carboxyl group,
the conduction aid comprises non-graphitizable carbon, and
the positive electrode active material is a spinel-type lithium-nickel-manganese oxide having a composition formula of $Li_{1+a}[Mn_{2-a-x-y}Ni_xM_y]O_4$, where
$0 \leq a \leq 0.2$,
$0.4 \leq x \leq 0.6$,
$0 \leq y \leq 0.3$, and
M is at least one metal element containing Ti.

10. A lithium ion secondary battery comprising:
a positive electrode containing the positive electrode combination material according to claim 1;
a negative electrode; and
a non-aqueous electrolytic solution.

11. The lithium ion secondary battery according to claim 10, wherein the aqueous binder comprises a substance having a carboxyl group.

12. The lithium ion secondary battery according to claim 10, wherein the aqueous binder comprises at least one selected from a copolymer comprising a carboxymethyl cellulose, a polyacrylic acid, an acrylic acid, a metal salt or ammonium salt thereof.

13. The lithium ion secondary battery according to claim 10, wherein the sum SE is 150 to 300 cm$^2$/cm$^2$ per unit coated area of the positive electrode combination material.

14. The lithium ion secondary battery according to claim 10, wherein the conduction aid is selected from carbon black, non-graphitizable carbon, vapor-grown carbon fibers, carbon tubes, graphite, graphitizable carbon, graphene, and metal powders.

15. The lithium ion secondary battery according to claim 10, wherein the conduction aid comprises non-graphitizable carbon.

16. The lithium ion secondary battery according to claim 10, wherein the positive electrode active material is selected from spinel-type lithium-manganese oxides, inverse-spinel type lithium-vanadium oxides, and polyanion compounds.

17. The lithium ion secondary battery according to claim 10, wherein the positive electrode active material is a spinel-type lithium-nickel-manganese oxide having a composition formula of $Li_{1+a}[Mn_{2-a-x-y}Ni_xM_y]O_4$, wherein
$0 \leq a \leq 0.2$,
$0.4 \leq x \leq 0.6$,
$0 \leq y \leq 0.3$, and
M is at least one metal element containing Ti.

18. The lithium ion secondary battery according to claim 10, wherein
the aqueous binder comprises a substance having a carboxyl group,
the conduction aid comprises non-graphitizable carbon, and
the positive electrode active material is a spinel-type lithium-nickel-manganese oxide having a composition formula of $Li_{1+a}[Mn_{2-a-x-y}Ni_xM_y]O_4$, where
$0 \leq a \leq 0.2$,
$0.4 \leq x \leq 0.6$,
$0 \leq y \leq 0.3$, and
M is at least one metal element containing Ti.

* * * * *